(12) United States Patent
Galehr

(10) Patent No.: US 9,051,003 B2
(45) Date of Patent: Jun. 9, 2015

(54) ELECTROMECHANICAL POWER STEERING SYSTEM WITH PLAY COMPENSATION FOR THE WORM GEAR MECHANISM

(75) Inventor: Robert Galehr, Mauren (LI)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 14/009,843

(22) PCT Filed: Mar. 23, 2012

(86) PCT No.: PCT/EP2012/001276
§ 371 (c)(1),
(2), (4) Date: Oct. 4, 2013

(87) PCT Pub. No.: WO2012/136315
PCT Pub. Date: Oct. 11, 2012

(65) Prior Publication Data
US 2014/0020973 A1 Jan. 23, 2014

(30) Foreign Application Priority Data

Apr. 4, 2011 (DE) .......................... 10 2011 015 883

(51) Int. Cl.
*B62D 5/04* (2006.01)
*F16H 57/022* (2012.01)
(Continued)

(52) U.S. Cl.
CPC ............ *B62D 5/0454* (2013.01); *B62D 5/0409* (2013.01); *F16H 2057/0224* (2013.01); *F16H 2057/0213* (2013.01); *F16H 2057/02082* (2013.01)

(58) Field of Classification Search
CPC ..................................................... B62D 5/0463
USPC .................... 180/443, 444; 384/255, 256, 447
See application file for complete search history.

(56) References Cited

U.S. PATENT DOCUMENTS 6,357,313 B1 * 3/2002 Appleyard ................ 74/388 PS
2011/0247891 A1 * 10/2011 Meyer et al. .................. 180/443

FOREIGN PATENT DOCUMENTS

DE            10053183 A1      6/2001
DE       102004014825 A1     10/2005
(Continued)

OTHER PUBLICATIONS

International Preliminary Report on Patentability issued in PCT/EP2012/001276 issue date Oct. 8, 2013.
(Continued)

*Primary Examiner* — Joseph Rocca
*Assistant Examiner* — Felicia L Brittman
(74) *Attorney, Agent, or Firm* — Panitch Schwarze Belisario & Nadel LLP

(57) ABSTRACT

The invention relates to an electromechanical steering system having an electric servomotor (1) which drives a worm shaft (2) which meshes with a worm gear (7) which is arranged on a steering shaft (8), wherein the worm gear (7) is operatively connected to an input shaft of a steering gear, and wherein the worm shaft (2) and the steering shaft (8) are mounted rotatably in a common gearbox casing (9), in which the worm shaft (2) has a free end (12) which is remote from the motor and is mounted in a rolling bearing (13) with an inner ring (14), rolling bodies (15) and an intermediate ring (16), wherein the intermediate ring has an inner running surface for the rolling bodies (15) and an outer running surface for outer rolling bodies (17), and wherein the inner running surface and the outer running surface of the intermediate ring (16) are arranged eccentrically with respect to one another.

7 Claims, 2 Drawing Sheets

Figure 1:
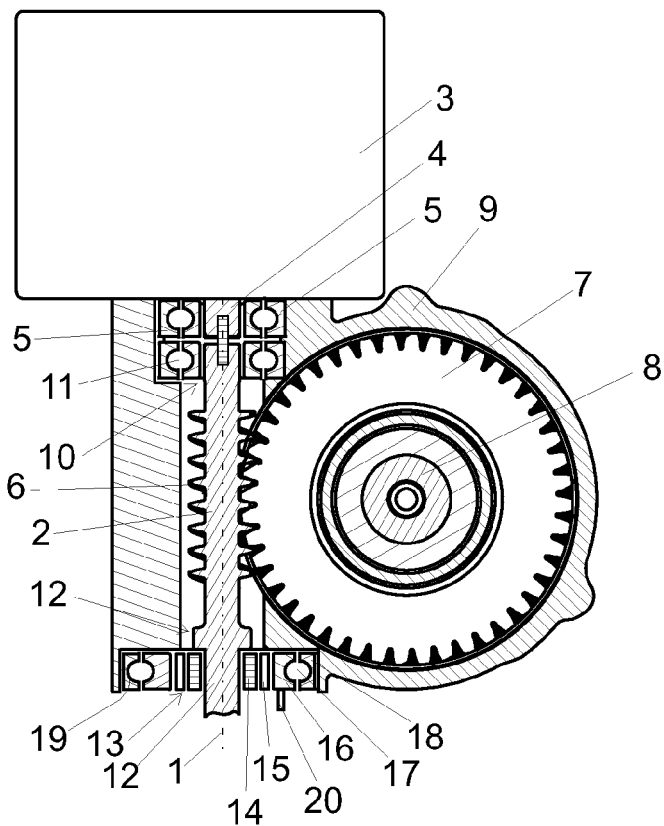

(51) Int. Cl.
*F16H 57/021* (2012.01)
*F16H 57/02* (2012.01)

(56) References Cited

FOREIGN PATENT DOCUMENTS

| | | | |
|---|---|---|---|
| DE | 102007019324 | A1 | 11/2007 |
| EP | 1676768 | A1 | 7/2006 |
| EP | 1727723 | B1 | 5/2008 |
| WO | WO-9911502 | A1 | 3/1999 |

OTHER PUBLICATIONS

International Search Report and Written Opinion issued in PCT/EP2012/001276 mailing date Sep. 3, 2012 with English Translations.

* cited by examiner

ELECTROMECHANICAL POWER STEERING SYSTEM WITH PLAY COMPENSATION FOR THE WORM GEAR MECHANISM

CROSS-REFERENCE TO RELATED APPLICATIONS

This Application is a National Stage of PCT International Application No. PCT/EP2012/001276, filed on Mar. 23, 2012, and claims priority of German Patent Application No. 10 2011015883.9, filed on Apr. 4, 2011. The disclosures of the aforementioned applications are incorporated herein in their entirety by reference.

The present system relates to an electromechanical power steering system.

When mounting shafts, it is conceivable and possible to use plain bearings, having an outer ring with an outer peripheral surface that is arranged eccentrically to the bearing surface. Such a bearing is only suitable for rotating shafts, however. It is disadvantageous when a shaft often comes to a standstill because plain bearings have a high breakaway torque. They require more fundamentally continuous lubrication and monitoring during operation. Therefore, plain bearings are not used for the mounting of drive shafts of electromechanical power steering systems.

European Patent EP 1 727 723 B1 discloses a ball bearing in an electromechanical power steering system with an eccentric outer ring, with which the position of a shaft mounted in the bearing can be adjusted. Following adjustment, the outer bearing shell is fixed in the bearing seat. Play compensation during operation, which may be necessary due to wear, is not provided for, however.

Document U.S. Pat. No. 6,357,313 B1 discloses an electromechanical power steering system comprising a worm gear mechanism, wherein the free end of the worm shaft is mounted in a ball bearing with concentric outer bearing ring. The ball bearing itself is arranged in a cam which is rotatably arranged in the steering housing about an axis which is spaced from the axis of rotation of the rolling bearing. In this way, the position of the rolling bearing and thus the engagement of the worm shaft in the assigned worm gear are adjustable by rotation of the cam in the housing. In one embodiment, the cam is acted upon by a spring force, so that the rolling bearing may be pretensioned with the shaft against the meshing engagement. The cam is in this case mounted in respect of the gearbox casing in a sliding bearing.

The latter embodiment of the prior art, which is considered as generic, is indeed capable of compensating for a change of the gear engagement between the worm shaft and the worm gear during operation. The required forces or torques that must ultimately be applied to the meshing engagement, are quite high, however, since the sliding bearing of the cam has a high breakaway torque in the gearbox casing. Accordingly, the burden on the transmission components is high when said worm shaft and the worm gear are in close engagement.

It is therefore an object of the present invention to provide a self-adjusting bearing of a worm shaft in the gear mechanism of an electromechanical power steering system in which the forces required for automatic adjustment are smaller.

This object is achieved by a device having the features of claim 1 or 6.

Since an electromechanical power steering system having an electric servomotor which drives a worm shaft which meshes with a worm gear which is arranged on a steering shaft, wherein the worm gear is operatively connected to an input shaft of a steering gear, and wherein the worm shaft and the steering shaft are mounted rotatably in a common gearbox casing, worm shaft has a free end which is remote from the motor and is mounted in a rolling bearing with an inner ring, rolling bodies and an intermediate ring, wherein the intermediate ring has an inner running surface for the rolling bodies and an outer running surface for outer rolling bodies, and wherein the inner running surface and the outer running surface of the intermediate ring are arranged eccentrically with respect to one another, the worm shaft when under load or if there is a change in engagement due to the effects of temperature can rapidly move out of the way. The rolling bearing of the cam in the gearbox casing allows for quick evasive action due to the low breakaway torque that must be overcome for the evasive action.

If the intermediate ring together with the rolling bodies and an outer ring form a rolling bearing that is eccentric to the rolling bearing, whose outer ring is seated in a bearing seat in the gearbox casing, the function is further improved. Preferably, the intermediate ring is pretensioned by spring means so that the worm shaft is forced into engagement with the worm gear.

The arrangement is particularly compact if the rolling bearing at the free end of the worm shaft is a needle bearing.

A particularly smooth adjustment is achieved when the rolling bearing supporting the intermediate ring in the gearbox casing is a ball bearing.

The object is also achieved in that in an electromechanical power steering system with an electric servo motor which drives a worm shaft which meshes with a worm gear arranged on a steering shaft, wherein the worm gear is in operative connection with an input shaft of a steering gear and the worm shaft and the steering shaft are rotatably supported in a common gearbox casing, the worm shaft having a free end remote from the motor, which is mounted in a rolling bearing with an inner ring, rolling bodies and an outer ring, wherein the rolling bearing is located in a cam lever which is mounted in the gearbox casing so that it can pivot about a pivot axis lying outside the rolling bearing.

Advantageously, the cam lever is pretensioned by a helical spring such that the worm shaft is forced into engagement with the worm gear.

It may also be provided that an electromechanical actuating element is arranged in the gearbox casing such that by the operation of the intermediate ring or the cam lever it can set or regulate the position of the worm shaft relative to the worm gear as a function of a controller. In particular, it can be provided that the control or regulation occurs in response to a torque applied by the servomotor. Thus, the engagement can be controlled as a function of the load.

Exemplary embodiments of the present invention are described in the following with reference to the drawing. These show as follows:

FIG. 1: The gear mechanism of a power steering system according to the invention in a longitudinal section, along the worm shaft.

Figure 2:
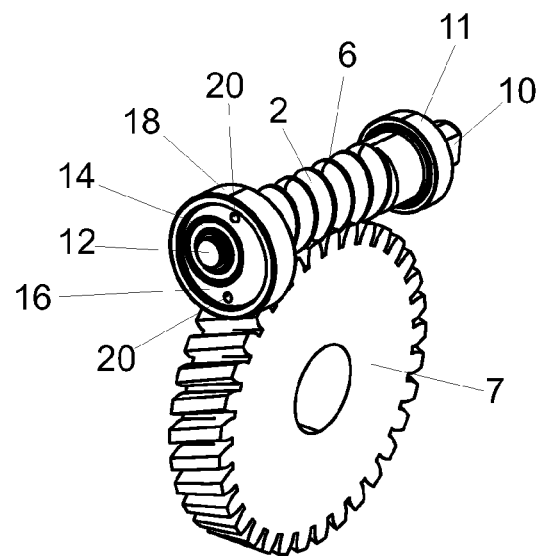
Figure 3:
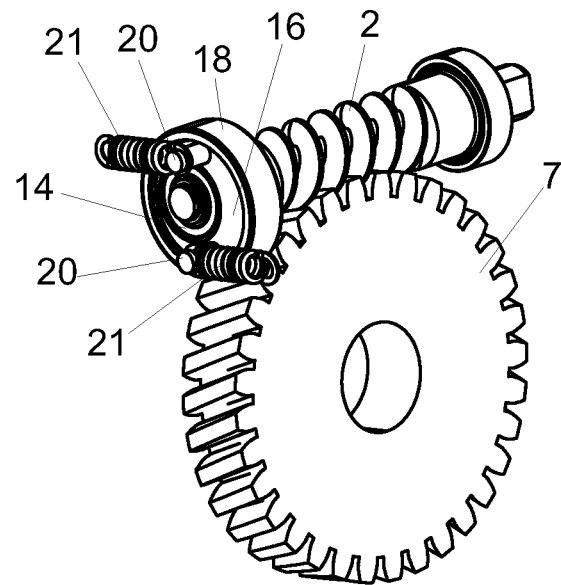

FIG. 2: The worm shaft with its bearing in a perspective view;

FIG. 3: The worm shaft of FIG. 2 with a spring pretensioning, and

Figure 4:
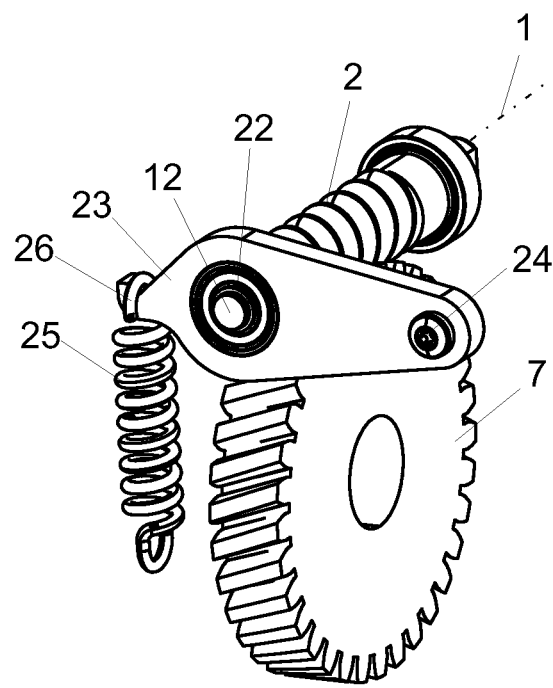

FIG. 4: A view corresponding to FIG. 3, wherein the pivot point of the cam is outside of the bearing of the worm shaft.

FIG. 1 shows in a longitudinal section the gear mechanism of an electromechanical power steering system and the longitudinal section running along an axis of rotation 1 of a worm shaft 2, which is driven by an electric motor 3. The electric motor 3 has a motor shaft 4 which is coupled via a flexible coupling 5 non-rotatably with the worm shaft 2. The worm shaft 2 meshes via a worm gearing 6 with a worm gear 7. The worm gear 7 is in turn non-rotatably connected to a steering shaft 8, which extends between a steering wheel (not shown), and the actual steering gear of the vehicle.

The stated components are mounted in a common gearbox casing 9.

The mounting of the worm shaft 2 in the casing 9 is at a motor-side end 10 of the worm shaft 2 in a conventional rolling bearing 11 in the form of a ball bearing. The ball bearing 11 is designed such that the worm shaft 2 can perform small axial movements and minor modifications to the axis of rotation 1 with respect to the casing 9.

The worm shaft 2 also has an end 12 remote from the motor, which is similarly mounted in a rolling bearing 13. The rolling bearing 13 comprises an inner ring 14, rolling bodies 15, and an intermediate ring 16. In turn, the intermediate ring 16 is itself provided on its outside with a running groove for balls 17. The balls 17 run in an outer ring 18, which is finally secured in a bearing seat 19 of the casing 9.

The intermediate ring 16 is finally provided with a pin 20 which is secured on the side of the intermediate ring 16 facing away from the casing 9.

The intermediate ring 16 is designed such that on its inner side a running surface for the rolling bodies 15 of the inner bearing 13 is formed. This running surface has a substantially cylindrical form, as the rolling bodies 15 are provided as pins in this exemplary embodiment. On the outer peripheral surface the intermediate ring 16 is provided with a ball running surface for the externally running balls 17, wherein the outer running surface is not positioned concentrically with the inner running surface. Rotation of the worm shaft 2 causes the intermediate ring 16 to define the position of the axis of rotation 1, while the inner rolling bearing 13 brings about the easy and play-free rotation of the worm shaft 2 relative to the intermediate ring 16. A rotation of the intermediate ring 16, however, causes a displacement of the axis of rotation 1 of the worm shaft 2, and thus a variation of the engagement of the worm 6 with the worm gear 7. In this manner, feeding of the worm shaft 2 to the worm gear 7 can, in particular, be effected in order to achieve a play-free meshing engagement.

In this arrangement, the intermediate ring 16 is likewise mounted relative to the casing 9 via the rolling bodies 17. In particular, the intermediate ring 16 itself forms a part of this outer bearing, which is formed from the intermediate ring 16, the rolling bodies 17 and the bearing outer ring 18. This arrangement allows for a very smooth adjustment of the intermediate ring 16, even if it is under load. A particularly fine and responsive adjustment of the position of the worm shaft 2, more specifically the axis of rotation 1 of the worm shaft 2 in relation to the worm gear 7 is in this way possible.

FIG. 2 shows the worm shaft with the rolling bearings and the worm gear 7 meshing with the worm shaft in a perspective view, wherein the components of the casing and the electric motor have been omitted. Identical components bear the same reference numbers. Here the intermediate ring 16 is provided with two actuating elements 20. These actuating elements 20 may serve as contact points for springs for elastic pretensioning, as described below regarding FIG. 3. They can also serve as contact points for an electric actuator, which operates the intermediate ring 16 in response to a control or regulation.

FIG. 2 shows how the axis of rotation of the worm shaft 2 is arranged concentrically to the inner ring 14 and to the inner running surface of the intermediate ring 16, but is positioned eccentrically in relation to the outer running surface of the intermediate ring 16 and the outer ring 18. Accordingly, rotation of the intermediate ring 16, causes a displacement of the axis of rotation 1 with respect to the worm gear 7. The centre of rotation of the intermediate ring 16, that is to say the point about which the intermediate ring 16 can rotate relative to the casing 9, is positioned in the centre of the outer ring 18. In FIG. 2 it can be seen that this pivot point is located within the inner rolling bearing 13, which is formed of the inner ring 14, the rolling bodies 15 and the inner running surface of the intermediate ring 16. The spatial distance between these two centres of rotation can be referred to as the eccentricity of the intermediate ring 16 and in the present case this eccentricity is less than the radius of the inner running surface of the intermediate ring 16. Such a low eccentricity is preferred in this exemplary embodiment because it permits a particularly fine adjustment of the position of the worm shaft 2.

FIG. 3 shows the exemplary embodiment of FIG. 2 with two helical springs 21 which act on the actuating elements 20. Here the actuating elements 20 take the form of pins which are arranged axially parallel to the end face of the intermediate ring 16. The helical springs 21 work on strain. They force the intermediate ring 16 in the exemplary embodiment according to FIG. 3 into an anticlockwise rotation. Since the pivot point of the worm shaft 2 is located on the left of the point of rotation of the intermediate ring 16, the worm shaft 2 is forced by the springs against the worm gear 7.

FIG. 4 shows an arrangement in which the worm shaft 2 is mounted rotatably at its free end 12 in a conventional rolling bearing 22. The rolling bearing 22 is seated with its outer ring in a cam lever 23 having a corresponding bearing seat. The cam lever 23 is mounted in a pivot axis 24 in the casing 9 (not shown). A helical spring 25, which in turn works on strain, engages with a hook-shaped end 26 of the cam lever 23, which is located opposite the pivot axis 24. The bearing 22 is arranged between the pivot axis 24 and the hook 26. The tension spring 25 acts downwards in FIG. 4, thereby pulling the cam lever 23 and thus the worm shaft towards the worm gear 7. In this way also an elastic pretensioning of the worm shaft 2 against the worm gear 7 is obtained. As in FIG. 3, in this way a play-free engagement of the worm shaft 2 in the worm gear 7 is achieved.

In contrast to the embodiments according to FIG. 2 and FIG. 3, in the embodiment according to FIG. 4 the bearing 22 and thus the axis of rotation of the worm shaft 2 is moved in a considerably larger radius, since the pivot axis 24 of the cam lever 23 is spaced further from the axis of rotation 1 of the worm shaft than in FIGS. 2 and 3. In particular here the eccentricity, that is to say the distance of the axis of rotation 1 from the pivot axis 24 is selected to be between one and three times the diameter of the rolling bearing 22.

In operation, these exemplary embodiments provide the advantage that the position of the worm shaft 2 with respect to the worm gear 7 is adjustable. In the embodiment according to FIG. 2 adjustment is by means of an actuator, while in the embodiment of FIGS. 3 and 4 it is by means of spring pretension. The mounting of the cam is in all cases designed such that the feeding of the worm shaft 2 to the worm gear 7 takes place at particularly low friction and low breakaway torque. In this way it is possible to compensate for small changes in the dimensions and in the relative position of components to one another, which may occur for example due to thermal influences. The cam mounting is easily movable so that no adverse forces arise in the area of the meshing engagement or in the area of the bearing.

REFERENCES

1. Axis of rotation
2. Worm shaft
3. Electric motor
4. Motor shaft

5. Coupling
6. Worm gearing
7. Worm gear
8. Steering shaft
9. Gearbox casing
10. End
11. Rolling bearing
12. End
13. Rolling bearing
14. Inner ring
15. Rolling body
16. Intermediate ring
17. Balls
18. Outer ring
19. Bearing seat
20. Pin
21. Helical springs
22. Rolling bearing
23. Cam lever
24. Pivot axis
25. Helical spring
26. Hook

What is claimed is:

1. An electromechanical power steering system including:
   an electric servomotor;
   a worm shaft configured to be driven by the electric servomotor, wherein the worm shaft has a free end that is remote from the electric servomotor;
   a rolling bearing in which the free end of the worm shaft is configured to be mounted, the rolling bearing including an inner ring, inner rolling bodies, and an intermediate ring, wherein the intermediate ring includes an inner running surface for the inner rolling bodies and an outer running surface for outer rolling bodies, wherein the inner running surface and the outer running surface of the intermediate ring are arranged eccentrically with respect to one another;
   a steering shaft; and
   a worm gear coupled to the steering shaft, wherein the worm shaft meshes with the worm gear,
   wherein the worm shaft and the steering shaft are mounted rotatably in a common gearbox casing.

2. The electromechanical power steering system according to claim 1, wherein the intermediate ring, together with the outer rolling bodies and an outer ring, forms a second rolling bearing eccentric to the rolling bearing, wherein the outer ring sits in a bearing seat in the gearbox casing.

3. The electromechanical power steering system according to claim 1, further including spring means coupled to the intermediate ring and pretensioned so that the worm shaft is forced to engage with the worm gear.

4. The electromechanical power steering system according to claim 1, wherein the rolling bearing on the free end of the worm shaft is a needle bearing.

5. The electromechanical power steering system according to claim 1, wherein a second rolling bearing supporting the intermediate ring in the gearbox casing comprises a ball bearing.

6. The electromechanical power steering system according to claim 1, further including an electromechanical actuating element configured, such that by the operation of the intermediate ring, the position of the worm shaft relative to the worm gear as a function of a controller can be set or regulated.

7. The electromechanical power steering system according to claim 6, wherein the setting or regulation occurs in response to a torque applied by the electric servomotor.

* * * * *